US011827366B1

United States Patent
Benjamin et al.

(10) Patent No.: US 11,827,366 B1
(45) Date of Patent: Nov. 28, 2023

(54) PITOT SYSTEM FOR EARLY EJECTION MODE DETECTION

(71) Applicant: Rockwell Collins, Inc., Cedar Rapids, IA (US)

(72) Inventors: Jeff Benjamin, Colorado Springs, CO (US); Cody Rahmann, Colorado Springs, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 17/743,412

(22) Filed: May 12, 2022

(51) Int. Cl.
  *B64D 25/10* (2006.01)
  *B64D 25/02* (2006.01)
  *B64D 11/06* (2006.01)

(52) U.S. Cl.
  CPC ............. *B64D 25/10* (2013.01); *B64D 25/02* (2013.01); *B64D 11/0689* (2013.01)

(58) Field of Classification Search
  CPC ................................. B64D 25/02; B64D 25/10
  See application file for complete search history.

(56) References Cited

U.S. PATENT DOCUMENTS

| | | | | |
|---|---|---|---|---|
| 4,448,374 A | * | 5/1984 | Duncan | B64D 17/62 244/152 |
| 4,505,444 A | * | 3/1985 | Martin | B64D 25/10 244/150 |
| 4,603,823 A | | 8/1986 | Ayoub | |
| 5,104,066 A | * | 4/1992 | Aronne | B64D 25/10 244/152 |
| 6,299,103 B1 | * | 10/2001 | Shope | B64D 25/10 297/216.16 |
| 6,327,764 B1 | * | 12/2001 | Knoll | B64D 43/02 29/434 |
| 2021/0122480 A1 | * | 4/2021 | Whelan | B64D 25/10 |

FOREIGN PATENT DOCUMENTS

CZ 16514 5/2006
GB 2384761 A * 8/2003 ......... B64D 11/0689

* cited by examiner

*Primary Examiner* — Richard G Davis
(74) *Attorney, Agent, or Firm* — SNELL & WILMER L.L.P.

(57) ABSTRACT

An ejection seat may comprise a seatback, a headrest located at an upper end of the seatback, and a pitot tube rotatably coupled to the headrest. A pitot restraint assembly may be operably coupled to the pitot tube. The pitot restraint assembly may be configured to translate between a restrained state and a released state. The pitot tube may rotate from a stowed position to a deployed position in response to the pitot restraint assembly translating to the released state.

15 Claims, 6 Drawing Sheets

PITOT SYSTEM FOR EARLY EJECTION MODE DETECTION

FIELD

The present disclosure relates generally to ejection seats, and more particularly, to ejection seat pitot systems.

BACKGROUND

Current ejection seats utilize a high energy catapult assembly (sometimes referred to as a rocket-catapult assembly) to expel the ejection seat from an aircraft. The high energy catapult assembly is an energetic device that includes a catapult stage and a rocket stage. The catapult stage fires first, ejecting the ejection seat and any occupant of the ejection seat from the aircraft cockpit. The rocket stage then ignites and propels the ejection seat and its occupant to a height associated with safe parachute recovery.

Current ejection seats may include a pitot system, which collects dynamic air pressure data upon the air inlet of the pitot tube entering the airstream outside the cockpit. The dynamic air pressure data is used by the ejection seat controller, along with static air pressure taken from a separate air inlet, for ejection mode selection. For example, the controller may determine an altitude and airspeed based on the dynamic and static air pressure data. The controller then selects an ejection mode based on the altitude and airspeed. The selected ejection mode controls the timing sequence for deploying one or more ejection seat subsystem(s). For example, the timing for deploying the main parachute and/or the drogue parachute may be based on the selected ejection mode (i.e., difference ejection modes employ difference timing sequences). Current pitot systems include either fixed pitot tubes or flip-up pitot tubes. Fixed pitot tubes are mounted to the main parachute container in a stationary, deployed position. Flip-up pitot tubes are also mounted to the main parachute container but are configured to be in a stowed position prior to ejection and to pivot (e.g., "flip-up") to a deployed position in response to deployment of the ejection seat. The location of the current pitot tubes tends to lead to the air inlet of the pitot tubes not being located in the airstream when the rocket stage of the high energy catapult assembly ignites. The air inlets not being in the airstream may lead to the combustion gases generated during the rocket stage of the high energy catapult assembly affecting the accuracy of the dynamic pressure data.

SUMMARY

An ejection seat is disclosed herein. In accordance with various embodiments, the ejection seat may comprise a seatback, a headrest located at an upper end of the seatback, and a pitot tube rotatably coupled to the headrest.

In various embodiments, a pitot restraint assembly is operably coupled to the pitot tube. The pitot restraint assembly is configured to translate between a restrained state and a released state. The pitot tube is configured to rotate from a stowed position to a deployed position in response to the pitot restraint assembly translating to the released state.

In various embodiments, an axis of rotation of the pitot tube is located proximate an upper end of the headrest. In various embodiments, the pitot restraint assembly includes a biased member configured to generate an interference with a rail located along a first side of the ejection seat. The interference between the rail and the biased member is configured to maintain the pitot restraint assembly in the restrained state. The pitot restraint assembly is configured to translate to the released state in response to removal of the interference between the rail and the biased member.

In various embodiments, a seat bucket is configured to translate relative to an axis of rotation of the pitot tube. In various embodiments, a main parachute assembly is located at the upper end of the seat back. The axis of rotation of the pitot tube is located between an upper end of the headrest and an upper surface of the main parachute assembly.

In various embodiments, the ejection seat may further comprise a high energy catapult configured to expel the ejection seat from an aircraft. The high energy catapult may include an outer tube coupled to the seatback and an inner tube located within the outer tube. The outer tube is configured to telescope relative to the inner tube. The high energy catapult may further include a base coupled to the inner tube, a propellant located in the inner tube, and a rocket mortar configured to ignite in response to the outer tube translating a threshold distance from the base.

In various embodiments, the pitot tube is configured to rotate to the deployed position prior ignition of the rocket mortar. In various embodiments, the pitot tube is coupled to the headrest such that an air inlet of the pitot tube will be located in an airstream outside a cockpit of the aircraft prior to a lower edge of the outer tube translating past upper edge of the inner tube.

An ejection seat, in accordance with various embodiments, may comprise a seatback, a headrest located at an upper end of the headrest, a pitot tube coupled to the headrest and configured to rotate between a stowed position and a deployed position, and a high energy catapult assembly configured to expel the ejection seat from an aircraft. The high energy catapult assembly may include a base, an inner tube coupled to the base, an outer tube coupled to the seatback and configured to telescope relative to the inner tube, a propellant located the inner tube, and a rocket mortar configured to ignite in response to the outer tube translating a threshold distance from the base.

In various embodiments, the pitot tube is configured to rotate to the deployed position prior ignition of the rocket mortar. In various embodiments, the pitot tube is coupled to the headrest such that an air inlet of the pitot tube will be located in an airstream outside a cockpit of the aircraft prior to a lower edge of the outer tube translating past upper edge of the inner tube.

In various embodiments, a main parachute assembly may be located at an upper end of the seatback. An axis of rotation of the pitot tube is located between an upper surface of the main parachute assembly and an upper end of the headrest.

In various embodiments, in the stowed position, an air inlet of the pitot tube is located between the upper surface of the main parachute assembly and the upper end of the headrest.

In various embodiments, the ejection seat further comprises a seat bucket. A distance between a seat of the seat bucket and the axis of rotation of the pitot tube is configured to change in response to translation of the seat.

In various embodiments, a pitot restraint assembly is operably coupled to the pitot tube. The pitot restraint assembly is configured to translate between a restrained state and a released state. The pitot tube is configured to rotate from the stowed position to the deployed position in response to the pitot restraint assembly translating to the released state. In various embodiments, the pitot restraint assembly may include a biased member configured to contact a rail located along a first side of the ejection seat.

An ejection seat, in accordance with various embodiments, may comprise a seatback, a main parachute assembly located at an upper end of the seatback, a passive head and neck protection system including a headrest located at the upper end of the seatback and forward the main parachute assembly, and a pitot tube coupled to the headrest and configured to rotate between a stowed position and a deployed position.

In various embodiments, an axis of rotation of the pitot tube is located between an upper surface of the main parachute assembly and an upper end of the headrest. In various embodiments, a pitot restraint assembly is operably coupled to the pitot tube. The pitot restraint assembly is configured to translate between a restrained state and a released state. The pitot tube is configured to rotate from the stowed position to the deployed position in response to the pitot restraint assembly translating to the released state.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
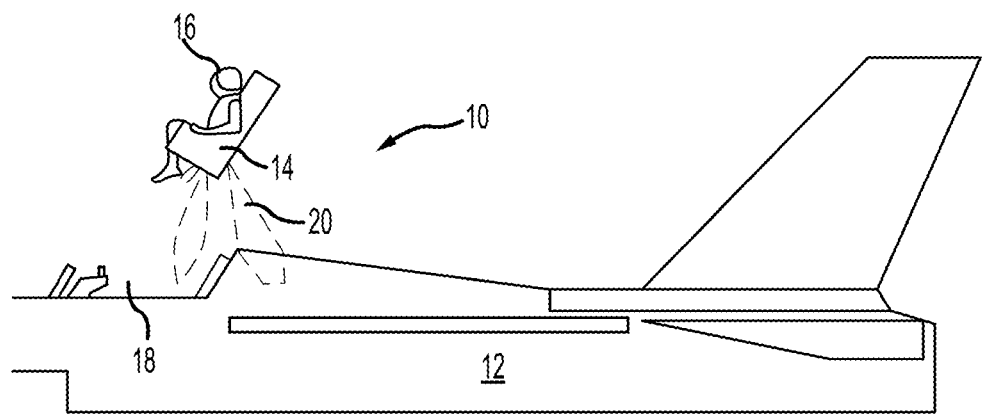
FIG. 1 illustrates an ejection seat being expelled from an aircraft, in accordance with various embodiments.

With reference to FIG. 1, an aircraft ejection system 10 is shown, in accordance with various embodiments. Aircraft ejection system 10 may be installed in aircraft 12 to expel an ejection seat 14 and an occupant 16 of the ejection seat 14 from a cockpit 18 of the aircraft 12. Ejection seat 14 may be urged from cockpit 18 by a propellant 20.

Figure 2A:
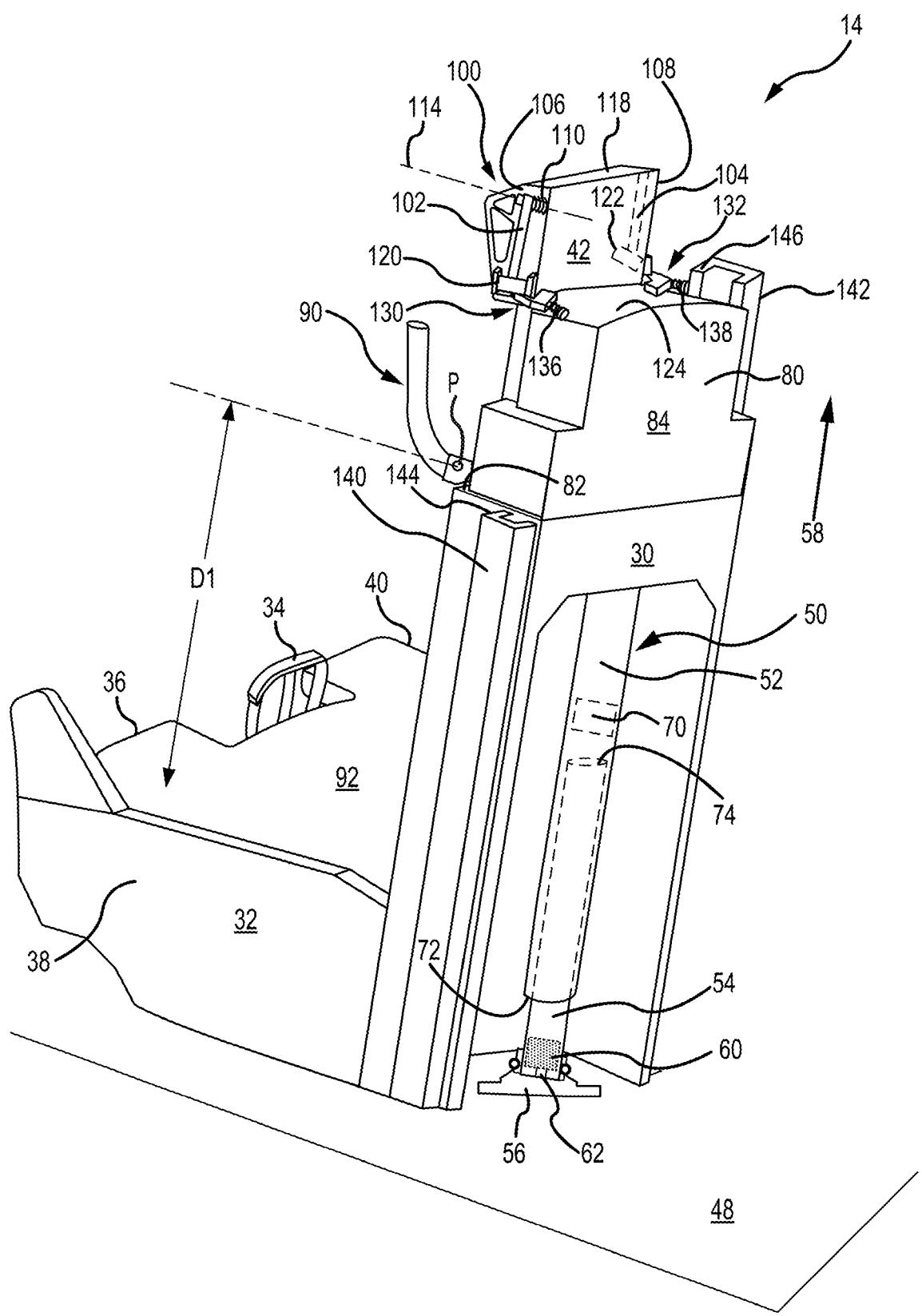
FIGS. 2A, 2B, and 2C illustrate an ejection seat having a pitot system in a stowed position, in accordance with various embodiments.

With additional reference to FIG. 2A, ejection seat 14 is illustrated in a non-deployed state (i.e., ejection seat 14 is illustrated prior to deployment of the ejection system 10 in FIG. 1). In accordance with various embodiments, ejection seat 14 includes a seatback 30 and a seat bucket 32. In various embodiments, an ejection handle 34 may be located proximate a frontside 36 of seat bucket 32. Frontside 36 of seat bucket 32 is generally opposite, or distal, seatback 30. While FIG. 2A shows ejection handle 34 located at the frontside 36 of seat bucket 32, it is contemplated and understood that ejection handle 34 may be located anywhere that is accessible to the occupant 16 (FIG. 1) of ejection seat 14. For example, ejection handle 34 may be located on a left side 38 of seat bucket 32, a right side 40 of seat bucket 32, or proximate a headrest 42 of ejection seat 14.

Ejection handle 34 may be configured to initiate an ejection sequence upon actuation. For example, occupant 16 (FIG. 1) pulling ejection handle 34 may initiate the ejection sequence that expels ejection seat 14 from aircraft 12. In accordance with various embodiments, ejection seat 14 includes a high energy catapult assembly 50. High energy catapult assembly 50 is configured to generate the propellant 20, with momentary reference to FIG. 1, that expels ejection seat 14 from cockpit 18. An outer tube 52 of high energy catapult assembly 50 is attached to ejection seat 14. For example, in various embodiments, outer tube 52 may be coupled to seatback 30. An inner tube 54 of high energy catapult assembly 50 is coupled to a base structure 56. Base structure 56 is a stationary structure within aircraft 12. In this regard, during deployment of ejection seat 14, base structure 56 and inner tube 54 remain stationary, while outer tube 52 and ejection seat 14, which is attached to outer tube 52, translate relative to inner tube 54 away from a floor 48 of the cockpit 18 (FIG. 1) and in the direction of arrow 58. High energy catapult assembly 50 is configured to deploy (i.e., fire) in response to initiation of the ejection sequence (e.g., in response to actuation of ejection handle 34).

High energy catapult assembly 50 includes a propellant 60 located in inner tube 54. An ignitor 62 is configured to fire (i.e., ignite) propellant 60 in response to initiation of the ejection sequence (e.g., in response to actuation of ejection handle 34). In various embodiments, propellant 60 may be a solid propellant, also referred to as a propellant grain. Upon ignition, propellant 60 combusts, thereby rapidly generating combustion gas which fills the internal volume of inner and outer tubes 54, 52. The combustion gas causes outer tube 52 to translate (i.e., telescope) relative to inner tube 54 and away from base structure 56. Stated differently, the flow of combustion gas generated by propellant 60 generates thrust for launching outer tube 52 and ejection seat 14 away from base structure 56 and floor 48 (i.e., in the direction of arrow 58).

High energy catapult assembly 50 further includes a high energy mortar 70 (also referred to as a rocket mortar). High energy mortar 70 is configured to fire in response to outer tube 52 translating a threshold distance away from base structure 56. For example, in various embodiments, rocket mortar 70 may be configured to fire in response to a lower edge 72 of outer tube 52 translating past an upper edge 74 of inner tube 54. In this regard, high energy mortar 70 continues providing upward thrust to expel ejection seat 14 from cockpit 18 and away from aircraft 12, after separation of outer tube 52 from inner tube 54.

In various embodiments, ejection seat 14 includes a main parachute assembly 80. Main parachute assembly 80 is located at an upper end 82 of seatback 30. As used herein, the term "upper" refers to an end or surface that is distal to, or generally farthest from, the floor 48 of the cockpit 18 (FIG. 1). A main parachute may be housed in a main parachute container 84 of main parachute assembly 80. The main parachute deploys from main parachute container 84. The main parachute is attached to occupant 16 and is configured to safely convey occupant 16 to the ground after ejection.

Figure 2B:
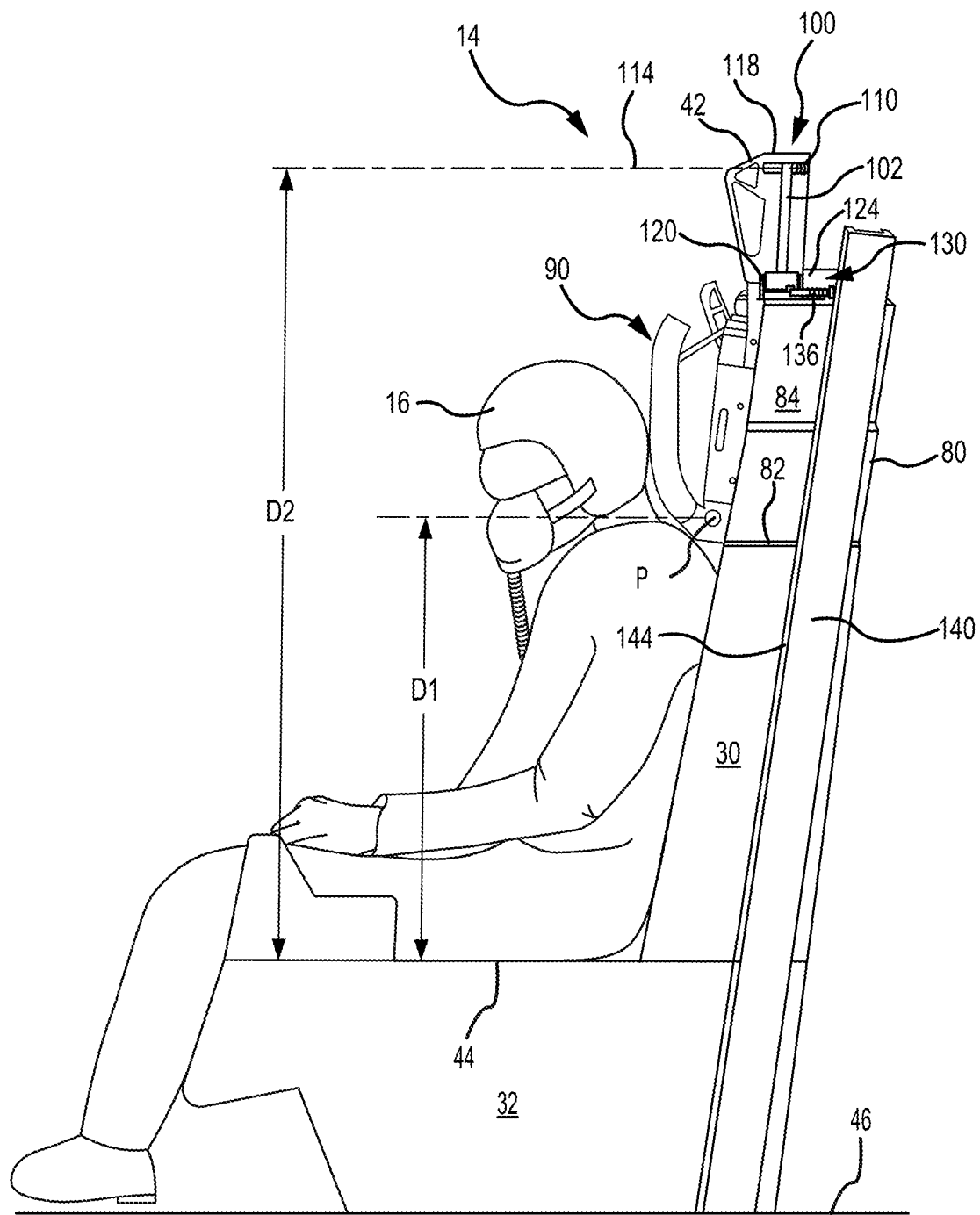

Ejection seat 14 may also include a passive head and neck protection (PHNP) system 90. PHNP system 90 may deploy in response to initiation of the ejection sequence. PHNP system 90 deploys from a PHNP stowed position, shown in FIGS. 2A, 2B, 2C, to a PHNP deployed position, shown in FIGS. 3A and 3B. In the PHNP deployed position, PHNP system 90 restricts rearward and side-to-side movement of the head and helmet of occupant 16 (FIG. 2B). In various embodiments, headrest 42 may be coupled to and/or a part of PHNP system 90. PHNP system 90 is located proximate the upper end 82 of seatback 30. PHNP system 90 and headrest 42 may be located forward of main parachute assembly 80. To accommodate different height occupants, seat bucket 32 and seatback 30 may translate relative to PHNP system 90 and headrest 42, thereby changing a distance D1 between a pivot point P of PHNP system 90 and a seat 92 of seat bucket 32. Seat 92 is the component of seat bucket 32 on which occupant 16 sits. For example, seat 92 may be a cushion. In this regard, prior to ejection, the distance between PHNP system 90 and floor 48 and the distance between headrest 42 and floor do not change, but the distance D1 between seat 44 and pivot point P may be changed depending on the height of occupant 16. Main parachute assembly 80 may translate with seatback 30, relative to PHNP system 90 and headrest 42.

Figure 2C:
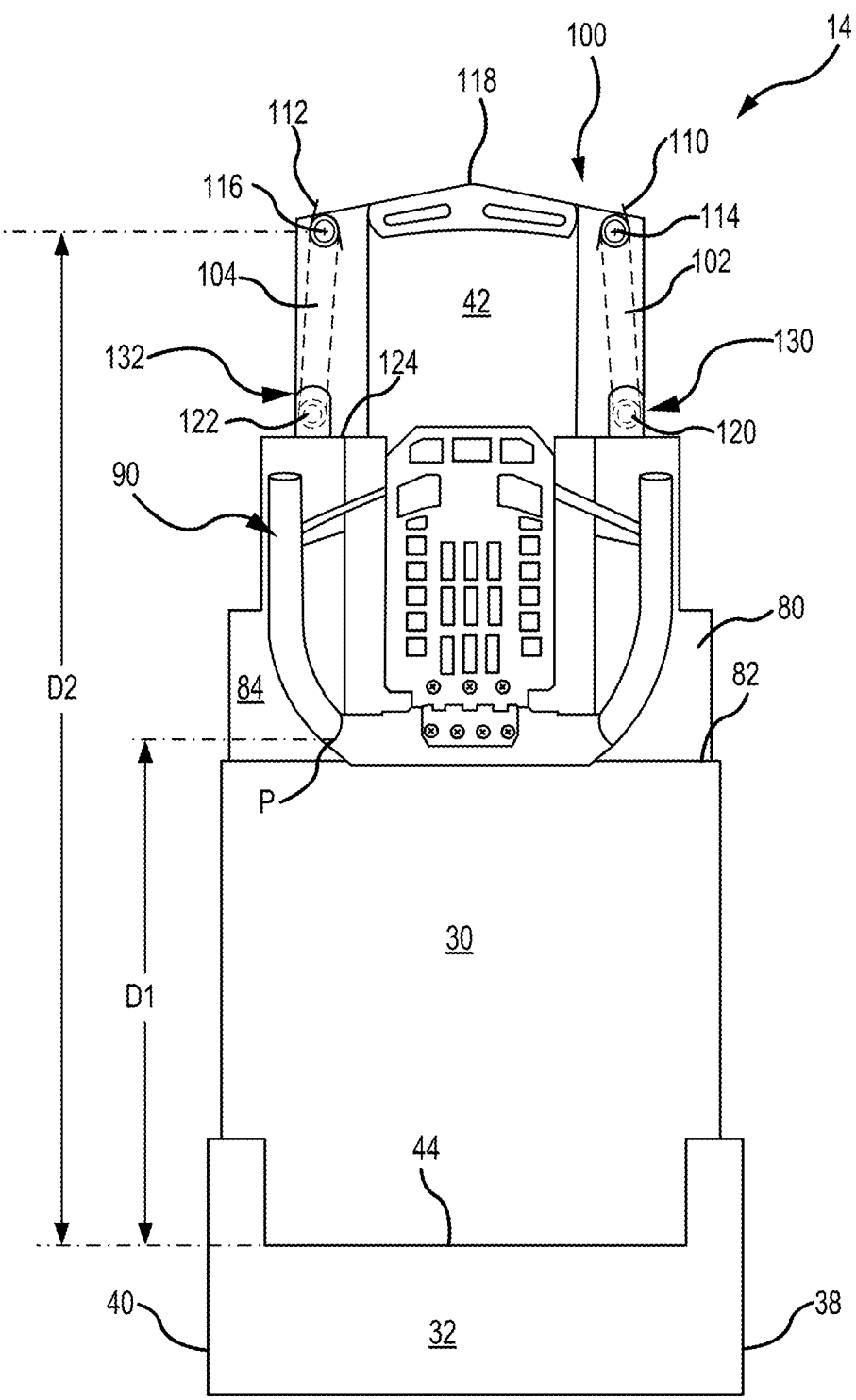
Figure 3A:
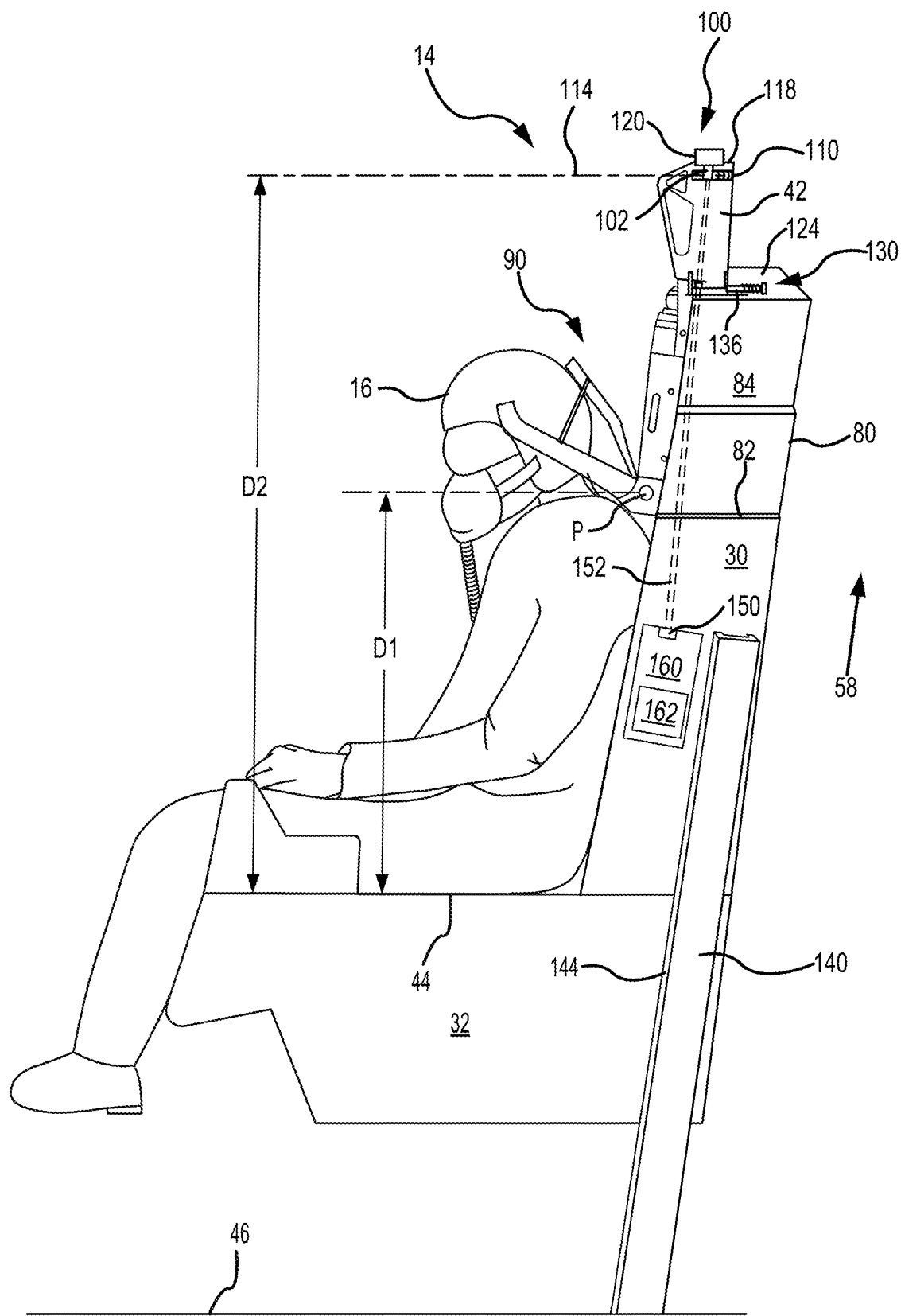
FIGS. 3A and 3B illustrate an ejection seat having a pitot system in a deployed position, in accordance with various embodiments.
Figure 3B:
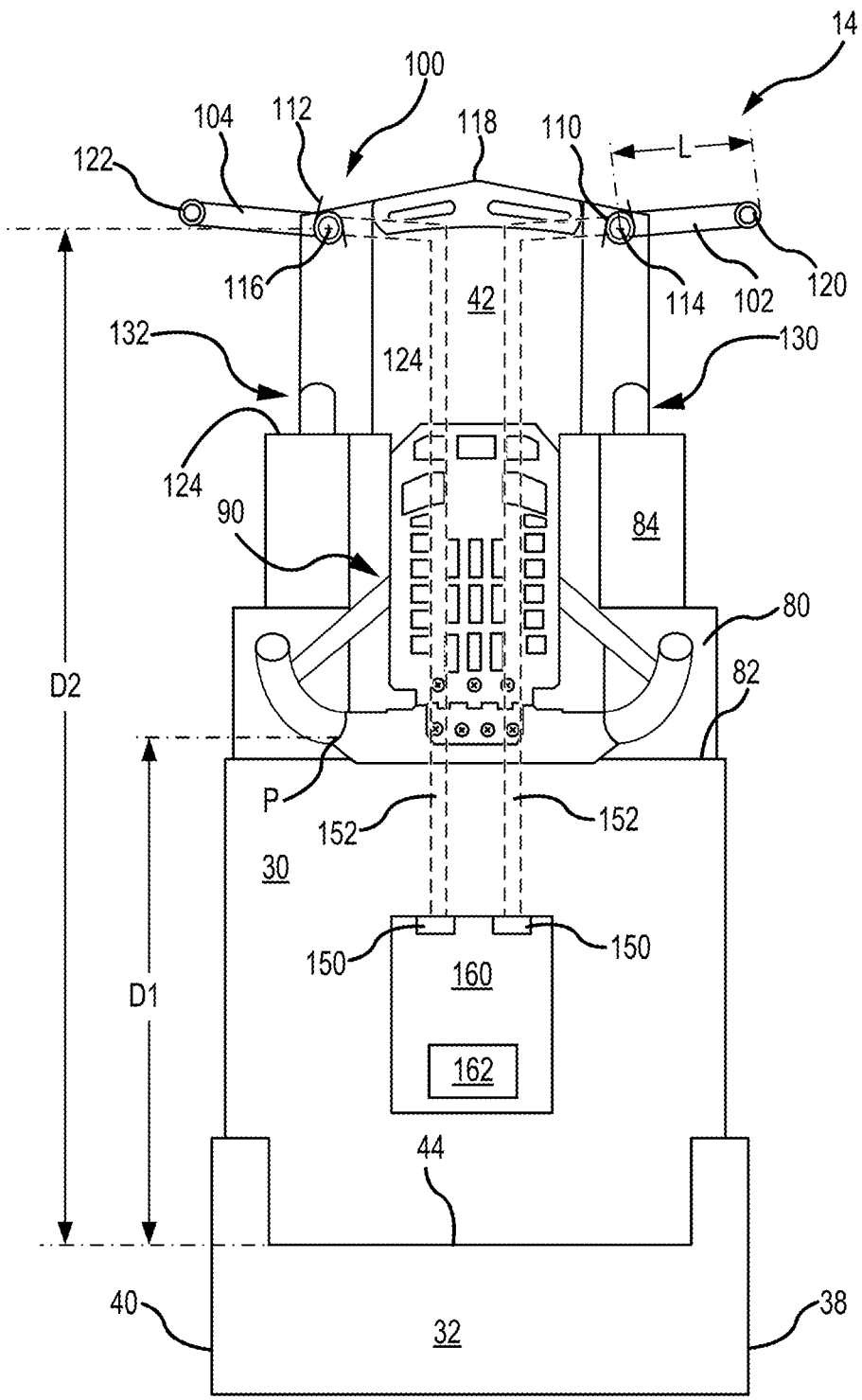

In accordance with various embodiments, ejection seat 14 includes a pitot system 100. Pitot system 100 is configured to rotate between a stowed position and a deployed position. In FIGS. 2A, 2B, and 2C, pitot system 100 is illustrated in the stowed position. In FIGS. 3A and 3B, pitot system 100 is illustrated in the deployed position With combined reference to FIGS. 2A, 2B, and 2C, pitot system 100 includes a left (or first) pitot tube 102 and a right (or second) pitot tube 104. Left pitot tube 102 is rotatably coupled to a first (or left) side 106 of headrest 42. Right pitot tube 104 is rotatably coupled to a second (or right) side 108 of headrest 42.

In accordance with various embodiments, a first tube biasing member 110 is configured to bias left pitot tube 102 away from first side 106 of headrest 42 and toward the deployed position of FIGS. 3A and 3B). A second tube biasing member 112 (FIG. 2C) is configured to bias right pitot tube 104 away from second side 108 of headrest 42 and toward the deployed position. Stated differently, first tube biasing member 110 is configured to rotate left pitot tube 102 in a first circumferential direction about an axis of rotation 114 of left pitot tube 102, and second tube biasing member 112 is configured to rotate right pitot tube 104 in a second circumferential direction about an axis of rotation 116 (FIG. 2C) of right pitot tube 104. The second circumferential direction is opposite the first circumferential direction.

Axis of rotation 114 of left pitot tube 102 is opposite, or distal to, a first air inlet 120 of left pitot tube 102. Axis of rotation 116 of right pitot tube 104 is opposite, or distal to, a second air inlet 122 of right pitot tube 104. Left pitot tube 102 and right pitot tube 104 are each coupled to headrest 42 such that axes of rotation 114, 116 are proximate an upper end 118 of headrest 42. Upper end 118 of headrest 42 may be the uppermost point of ejection seat 14. In this regard, axes of rotation 114, 116 may be above main parachute assembly 80. Stated differently, axes of rotation 114, 116 may be between an upper surface 124 of main parachute assembly 80 and upper end 118 of headrest 42. In the stowed position, first and second air inlets 120, 122 may be located between upper surface 124 of main parachute assembly 80 and axes of rotation 114, 116, respectively. In various embodiments, in the stowed position, first and second air inlets 120, 122 may be located between upper surface 124 of main parachute assembly 80 and upper end 118 of headrest 42. As discussed in further detail below, the location of axis of rotation 114 and axis of rotation 116 are selected such that, when deployed, first air inlet 120 and second air inlet 122 are in the airstream (e.g., outside cockpit 18) when rocket mortar 70 ignites and/or when outer tube 52 separates from inner tube 54. As discussed above, seat bucket 32 and seatback 30 translate relative to PHNP system 90 and headrest 42. Translation of seat bucket 32 and seatback 30 relative to headrest 42 changes a distance D2 between axes of rotation 114, 116 and seat 44 of seat bucket 32. In this regard, prior to ejection, the distance between axes of rotation 114, 116 and floor 46 does not change, but the distance D2 between seat 44 and axes of rotation 114, 116 may be changed depending on the height of occupant 16.

In accordance with various embodiments, a first pitot restraint assembly 130 is configured to maintain left pitot tube 102 in a restrained position. A second pitot restraint assembly 132 is configured to maintain right pitot tube 104 in the restrained position. Each of first pitot restraint assembly 130 and second pitot restraint assembly 132 are configured to translate between a restrained state (FIGS. 2A, 2B, 2C) and a released state (FIGS. 3A and 3B). Left pitot tube 102 rotates to the deployed position (FIGS. 3A, 3B) in response to first pitot restraint assembly 130 translating to the released state. Right pitot tube 104 rotates to the deployed position (FIGS. 3A, 3B) in response to second pitot restraint assembly 132 translating to the released state.

First pitot restraint assembly 130 and second pitot restraint assembly 132 are configured to translate to the released state during expulsion of ejection seat 14. For example, first pitot restraint assembly 130 and second pitot restraint assembly 132 may translate to the released state in response to ejection seat 14 translating a threshold distance from the floor 46 of cockpit 18 (FIG. 1). In various embodiments, first pitot restraint assembly 130 and second pitot restraint assembly 132 may be configured to translate to the released state prior to rocket mortar 70 igniting and/or prior to lower edge 72 of outer tube 52 translating past upper edge 74 of inner tube 54.

In various embodiments, in the restrained state, at least a portion of first pitot restraint assembly 130 may be located against a left (or first) rail 140 and at least a portion of second pitot restraint assembly 132 may be located against a right (or second) rail 142, respectively. In accordance with various embodiments, left rail 140 and right rail 142 are located proximate a left side and a right side, respectively, of ejection seat 14. In FIGS. 2A and 2B, the upper portion of the left rail 140 has been removed to better illustrate first pitot restraint assembly 130. Left and right rails 140, 142 receive sliders attached to the left and right sides of ejection seat 14 to help guide and/or control translation of ejection seat 14 during expulsion of ejection seat 14 from cockpit 18 (FIG. 1). Left and right rails 140, 142 are stationary structures which remain in cockpit 18 during expulsion of ejection seat 14. The coupling between first and second restraint assemblies 130, 132 and ejection seat 14 causes first and second restraint assemblies 130, 132 to translate with ejection seat 14, relative to left and right rails 140, 142 during ejection.

In various embodiments, a biased member 136 of first pitot restraint assembly 130 may contact and form an interference with a forward wall 144 of left rail 140. The interference blocks or generally prevents translation of biased member 136, thereby maintaining first pitot restraint assembly 130 in the restrained position and left pitot tube 102 in the stowed position. Biased member 136 is biased toward, and into contact with, a surface of forward wall 144. In this regard, when biased member 136 is contacting forward wall 144, left rail 140 generates an interference with biased member 136. The interference between left rail 140 and biased member 136 maintains first pitot restraint assembly 130 in the restrained state (i.e., the interference prevents first pitot restraint assembly 130 from translating to the released state). In this regard, the interference between left rail 140 and biased member 136 maintains left pitot tube 102 in the stowed position.

In various embodiments, a biased member 138 of second pitot restraint assembly 132 may contact and form an interference with a forward wall 146 of right rail 142. The interference blocks or generally prevents translation of biased member 138, thereby maintaining second pitot restraint assembly 132 in the restrained position and right pitot tube 104 in the stowed position. Biased member 138 is biased toward, and into contact with, a surface of forward wall 146. In this regard, when biased member 138 is contacting forward wall 146, right rail 142 generates an interference with biased member 138. The interference between right rail 142 and biased member 138 maintains second pitot restraint assembly 132 in the restrained state (i.e., the interference prevents second pitot restraint assembly 132 from translating to the released state). In this regard, the interference between right rail 142 and biased member 138 maintains right pitot tube 104 in the stowed position.

With reference to FIGS. 3A and 3B, pitot system 100 is illustrated in the deployed position. During ejection, biased member 136 of first pitot restraint assembly 130 and biased member 138 (FIG. 2A) of second pitot restraint assembly 132 may translate, or slide, along forward wall 144 of left rail 140 and forward wall 146 (FIG. 2A) of right rail 142 (FIG. 2A), respectively. The interference between left rail 140 and biased member 136 is removed in response to biased member 136 translating past the upper edge of forward wall 144. First pitot restraint assembly 130 is configured to translate to the released state in response to biased member 136 translating past (e.g., above) the upper edge of left rail 140. In response to removal of the interference between biased member 136 and forward wall 144 of left rail 140, biased member 136 translates in a first direction (e.g., away from first air inlet 120). The translation of biased member 136 in the first direction causes first pitot restraint assembly 130 to translate to the released state. In response to first pitot restraint assembly 130 translating to the released state, left pitot tube 102 rotates to the deployed position. Stated differently, in response to removal of the interference between biased member 136 and left rail 140, first pitot restraint assembly 130 translates to the released state and left pitot tube 102 rotates to the deployed position. It is contemplated and understood that right pitot tube 104 and second pitot restraint assembly 132 are mirror images of left pitot tube 102 and first pitot restraint assembly 130, respectively. In this regard, right pitot tube 104 and second pitot restraint assembly 132 include the same features and functionalities as described herein with reference to left pitot tube 102 and first pitot restraint assembly 130. Additionally, it is further contemplated and understood that other types of pitot restraint assemblies may be employed to control rotation of left and right pitot tubes 102, 104. For example, levers, pins, struts, or other structure(s) may generate an interference with left and right pitot tubes 102, 104. An actuator may actuate the interference structure(s) in response to deployment of ejection seat 14. Left and right pitot tubes 102, 104 may rotate to the deployed position in response to removal of the interference structure. In this regard, any restraint assembly that prevents rotation of left and right pitot tubes 102, 104 prior to deployment of ejection seat 14 and allows left and right pitot tubes 102 to rotate to the deployed position prior the upper end 118 of headrest 42 entering the wind stream outside cockpit 18 may be employed by pitot system 100.

In the deployed position, fluid (e.g., air) enters left pitot tube 102 via first air inlet 120 and right pitot tube 104 via second air inlet 122. Left and right pitot tubes 102, 104 are operably connected to pressure sensors 150 via conduits 152. In this regard, the fluid received at first and second air inlets 120, 122 is routed to pressure sensors 150 via conduits 152. Pressure sensors 150 may be part of and/or in communication with a controller 160. Controller 160 is configured to receive pressure measurements from pressure sensors 150.

Controller 160 may include one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof. A tangible, non-transitory computer-readable storage medium 162 may be in communication with controller 160. Storage medium 162 may comprise any tangible, non-transitory computer-readable storage medium known in the art. The storage medium 162 has instructions stored thereon that, in response to execution by controller 160, cause controller 160 to perform operations related to selecting an ejection mode based on dynamic pressure data received from the pressure sensors 150. In this regard, controller 160 receives dynamic pressure data from the pressure sensors 150 and selects an ejection mode based on dynamic pressure data. For example, controller 160 may determine an altitude and an airspeed based on the dynamic pressure data and may select a timing sequence for deploying various subsystem of ejection seat 14 (e.g., selects an ejection mode) based on the altitude and airspeed.

With combined reference to FIG. 2A and FIG. 3B, locating left and right pitot tubes on headrest 42 and above main parachute container 84 allows first and second air inlets 120, 122 to be located farther away from lower edge 72 of outer tube 52, as compared to attaching the pitot tubes to main parachute container 84. Locating first and second axes of rotation 114, 116 proximate upper end 118 of headrest 42 may also allow for longer left and right pitot tubes 102, 104. For example, in various embodiments, a length L of each of left and right pitot tubes 102, 104 may be 6.0 inches (15.2 cm) or greater. For example, length L may be between 6.0 inches and 12.0 inches (15.2 cm and 30.5 cm). Length L of left pitot tube 102 is measured between the axis of rotation 114 of left pitot tube 102 and a distal end of left pitot tube 102. The distal end is the end farthest from axis of rotation 114. Length L of right pitot tube 104 is measured between the axis of rotation 116 of right pitot tube and a distal end of right pitot tube 104. The distal end is the end farthest from axis of rotation 116.

Locating first and second air inlets 120, 122 farther away from lower edge 72 of outer tube 52 also causes first and second air inlets 120, 122 to be located in the air stream outside of cockpit 18 (e.g., located above where a canopy or hatch would be located prior to expulsion of ejection seat 14) when rocket mortar 70 ignites and/or when lower edge 72 of outer tube 52 translate past upper edge 74 of inner tube. Locating first and second air inlets 120, 122 farther away from lower edge 72 of outer tube 52 and/or in the air stream outside of cockpit 18 reduces a likelihood that the combustion gases generated by rocket mortar 70 will flow into first and second air inlets 120, 122. Stated differently, the location of first and second air inlets 120, 122 reduces the effect of the combustion gases generated by rocket mortar 70 on the dynamic pressure data, thereby increasing the accuracy of the altitude and windspeed determinations. Increased accuracy increases the probability that the controller 160 selects the proper and/or safest ejection mode. Additionally, locating the first and second air inlets 120, 122 higher (e.g., proximate the upper end 118 of the headrest 42) may allow for faster ejection mode selection, as the controller 160 receives the dynamic pressure data sooner. Making the ejection mode selection sooner increases safety, particularly, for high-speed and/or low ground clearance ejections.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 115(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An ejection seat, comprising:
   a seatback;
   a headrest located at an upper end of the seatback;
   a pitot tube rotatably coupled to the headrest; and
   a main parachute assembly located at an upper end of the seatback, wherein an axis of rotation of the pitot tube is located between an upper surface of the main parachute assembly and an upper end of the headrest and wherein in the stowed position, an air inlet of the pitot tube is located between the upper surface of the main parachute assembly and the upper end of the headrest.

2. The ejection seat of claim 1, further comprising a pitot restraint assembly operably coupled to the pitot tube, the pitot restraint assembly being configured to translate between a restrained state and a released state, wherein the pitot tube is configured to rotate from a stowed position to a deployed position in response to the pitot restraint assembly translating to the released state.

3. The ejection seat of claim 2, wherein the pitot restraint assembly includes a biased member configured to generate an interference with a rail located along a first side of the ejection seat, the interference between the rail and the biased member being configured to maintain the pitot restraint assembly in the restrained state, and wherein the pitot restraint assembly is configured to translate to the released state in response to removal of the interference between the rail and the biased member.

4. The ejection seat of claim 2, further comprising a seat bucket configured to translate relative to the axis of rotation of the pitot tube.

5. The ejection seat of claim 1, further comprising a high energy catapult configured to expel the ejection seat from an aircraft, the high energy catapult including:
   an outer tube coupled to the seatback;
   an inner tube located within the outer tube, wherein the outer tube is configured to telescope relative to the inner tube;
   a base coupled to the inner tube;
   a propellant located in the inner tube; and
   a rocket mortar configured to ignite in response to the outer tube translating a threshold distance from the base.

6. The ejection seat of claim 5, wherein the pitot tube is configured to rotate to the deployed position prior ignition of the rocket mortar.

7. The ejection seat of claim 5, wherein the pitot tube is coupled to the headrest such that an air inlet of the pitot tube will be located in an airstream outside a cockpit of the aircraft prior to a lower edge of the outer tube translating past upper edge of the inner tube.

8. An ejection seat, comprising a seatback;
a headrest located at an upper end of the headrest;
a pitot tube coupled to the headrest and configured to rotate between a stowed position and a deployed position;
a high energy catapult assembly configured to expel the ejection seat from an aircraft, the high energy catapult assembly including:
a base;
an inner tube coupled to the base;
an outer tube coupled to the seatback and configured to telescope relative to the inner tube;
a propellant located in the inner tube; and
a rocket mortar configured to ignite in response to the outer tube translating a threshold distance from the base; and
a main parachute assembly located at an upper end of the seatback, wherein an axis of rotation of the pitot tube is located between an upper surface of the main parachute assembly and an upper end of the headrest and wherein in the stowed position, an air inlet of the pitot tube is located between the upper surface of the main parachute assembly and the upper end of the headrest.

9. The ejection seat of claim 8, wherein the pitot tube is configured to rotate to the deployed position prior ignition of the rocket mortar.

10. The ejection seat of claim 8, wherein the pitot tube is coupled to the headrest such that an air inlet of the pitot tube will be located in an airstream outside a cockpit of the aircraft prior to a lower edge of the outer tube translating past upper edge of the inner tube.

11. The ejection seat of claim 8, further comprising a seat bucket, wherein a distance between a seat of the seat bucket and the axis of rotation of the pitot tube is configured to change in response to translation of the seat.

12. The ejection seat of claim 8, further comprising a pitot restraint assembly operably coupled to the pitot tube, the pitot restraint assembly being configured to translate between a restrained state and a released state, wherein the pitot tube is configured to rotate from the stowed position to the deployed position in response to the pitot restraint assembly translating to the released state.

13. The ejection seat of claim 12, wherein the pitot restraint assembly includes a biased member, the biased member being configured to contact a rail located along a first side of the ejection seat.

14. An ejection seat, comprising
a seatback;
a main parachute assembly located at an upper end of the seatback;
a passive head and neck protection system including a headrest located at the upper end of the seatback and forward the main parachute assembly; and
a pitot tube coupled to the headrest and configured to rotate between a stowed position and a deployed position, wherein an axis of rotation of the pitot tube is located between an upper surface of the main parachute assembly and an upper end of the headrest and wherein, in the stowed position, an air inlet of the pitot tube is located between the upper surface of the main parachute assembly and the upper end of the headrest.

15. The ejection seat of claim 14, further comprising a pitot restraint assembly operably coupled to the pitot tube, the pitot restraint assembly being configured to translate between a restrained state and a released state, wherein the pitot tube is configured to rotate from the stowed position to the deployed position in response to the pitot restraint assembly translating to the released state.

* * * * *

UNITED STATES PATENT AND TRADEMARK OFFICE
CERTIFICATE OF CORRECTION

| | | |
|---|---|---|
| PATENT NO. | : 11,827,366 B1 | |
| APPLICATION NO. | : 17/743412 | |
| DATED | : November 28, 2023 | |
| INVENTOR(S) | : Jeff Benjamin | |

It is certified that error appears in the above-identified patent and that said Letters Patent is hereby corrected as shown below:

On the Title Page

Column 1, please insert -- Prior Publication Data US 2023/0365266 A1 Nov. 16, 2023 --

Signed and Sealed this
Twenty-seventh Day of February, 2024

Katherine Kelly Vidal
*Director of the United States Patent and Trademark Office*